2,833,817
PROCESS FOR THE PREPARATION OF TEREPHTHALIC ACID

Alfred Saffer, Bayside, N. Y., assignor, by mesne assignments, to Mid-Century Corporation, Chicago, Ill., a corporation of Delaware No Drawing. Application June 27, 1956
Serial No. 594,085

13 Claims. (Cl. 260—524)

This invention relates to a process for the catalytic oxidation of diisopropylbenzenes by means of air or other molecular oxygen containing gaseous material to produce phthalic acids therefrom wherein the catalyst is a heavy metal compound, particularly to such a process wherein the catalyst is a manganese compound, and more particularly an organic carboxylate salt of manganese. The invention relates especially to such a process conducted at an elevated pressure in the presence of a lower organic carboxylic acid of 1 to 4 carbon atoms in the molecule, wherein the ratio of lower carboxylic acid is in the range of 1 to 10 parts per part by weight of diisopropylbenzene, or in the presence of a lower organic carboxylic acid of 5 to 6 carbon atoms in the molecule, wherein there is present 1 to 8 mols of said acid per mol of diisopropylbenzene, or in the presence of such a mono-carboxylic acid of up to and including 8 carbon atoms in the molecule.

Various attempts have been made in the past to oxidize dialkyl hydrocarbons in the liquid phase with molecular oxygen to produce dicarboxylic acids, particular terephthalic acid. Heretofore it has not been possible to obtain more than very small yields, i. e., in the order of 1–3% of the desired dicarboxylic acids.

Terephthalic acid is a commercially highly desirable intermediate for the preparation of polyester type resins, and also for the preparation of polyester type textile fibers, such as the polymeric ethylene glycol terephthalate. For use in the polyester resins, the terephthalic acid may contain a substantial quantity of isophthalic acid, and indeed in some instances such a mixture leads to highly desirable products.

However, for use in synthetic textile fibers, a very high purity terephthalic acid is required and the art is confronted with the problem of providing high purity terephthalic acid in economic manner.

Isophthalic acid is a commercially highly desirable intermediate for the preparation of polyester type resins such as glycerol, pentaethrythritol, and the like. Similarly, phthalic acid finds utilization in the preparation of alkyd type resins.

It has been found, in accordance with the invention, that phthalic acids may be prepared in a very convenient and economic manner by the oxidation of diisopropylbenzenes by means of molecular oxygen in the presence of a manganese compound, for example, a manganese carboxylate catalyst; and the process is especially convenient and advantageous if carried out at elevated pressure in the presence of a lower organic carboxylic acid of 1 to 4 carbon atoms, using a ratio of 1 to 10 parts of lower carboxylic acid per part of diisopropylbenzene, or of a lower organic carboxylic acid of 5 to 6 carbon atoms, using a ratio of 1 to 8 mols of the lower carboxylic acid per mol of diisopropylbenzene, or in the presence of such a mono-carboxylic acid of up to and including 8 carbon atoms in the molecule.

The objects achieved in accordance with the invention as described herein include the provision of a process for obtaining high purity terephthalic acid in an economic and convenient manner by the reaction of molecular oxygen with para-diisopropylbenzene at elevated pressure in the presence of a heavy metal compound, preferably a manganese carboxylate salt, as catalyst, and a lower carboxylic acid of 1 to 4 carbon atoms, using a ratio of 1 to 10 parts of the lower carboxylic acid per part by weight of para-diisopropylbenzene, or a lower carboxylic acid of 5 to 6 carbon atoms, using a ratio of 1 to 8 mols of the lower acid per mol of para-diisopropylbenzene, or such a mono-carboxylic acid of up to and including 8 carbon atoms in the molecule; and other objects which will be apparent as details or embodiments of the invention are set forth hereinafter.

Similarly, if it is desired to produce isophthalic acid or phthalic acid of high purity this object is achieved in accordance with the invention by substituting meta-diisopropylbenzene or ortho-diisopropylbenzene respectively, for para-diisopropylbenzene in the oxidation system described immediately above.

In order to facilitate a clear understanding of the invention, the following preferred specific embodiments are described in detail.

Example 1

Into a suitable pressure reactor having a corrosion resistant inner surface (e. g., glass, ceramic or corrosion resistant metal or alloy), equipped with agitating means such as a mechanical agitating device or gas flow agitating means, and with means for heating or cooling the contents thereof such as a coil or jacket, a condenser for refluxing non-aqueous condensate and some of the water to the reaction vessel, a gas inlet tube, and a valved vent for passing off inert gases and low boiling materials, there are charged:

125 parts by weight of para-diisopropylbenzene (90% para- and 10% meta-)
273 parts of acetic acid
3.75 parts of manganese cumate The reaction vessel is about half filled with the liquid mixture.

Substantially 100% oxygen is passed into the reaction mixture at the rate of about 1000 volumes (measured at atmospheric pressure and about 27° C.) per volume of hydrocarbon per hour, some gas being passed out through the vent system, while the reaction mixture is maintained at 200° C., with vigorous agitation, for 9 hours. The pressure is maintained at about 300 to 400 p. s. i. g.; the pressure being such that the reaction mixture contains a liquid acid phase.

The crude solid terephthalic acid in the mixture is separated by filtration, given three washings with about 100% acetic acid, each washing being with about 300 parts by weight of acetic acid per 40 parts of the precipitate, and then given three washings with water, using approximately similar amounts. The acetic acid washings are distilled, leaving a residue containing crude isophthalic acid.

The distillation is continued until the temperature reaches 139° C. at 1–2 mm. Hg pressure for a first cut. The distillation is then continued up to a temperature of 250° C. at 1–2 mm. Hg pressure. The residue remaining in the distillation vessel is resinous and carbonaceous. The distillate cuts may be recycled to the reactor, e. g., in the next run.

A yield of 20 to 90% by weight of crude terephthalic acid of about 50 to 90% or more purity is obtained, based on the paradiisopropylbenzene charged.

Example 2

The above example is repeated with:

125 parts by weight of para-diisopropylbenzene (90% para- and 10% meta-)
273 parts of caproic acid (23 parts of which is placed in the separatory device to be displaced into the reaction vessel by the water as condensed in the reflux condenser)
3.75 parts of manganese cumate Substantially 100% oxygen is fed into the reaction mixture at the rate of about 1000 volumes (measured at atmospheric pressure and about 27° C.) per volume of hydrocarbon per hour, while the reaction mixture is maintained at 180° C., with vigorous mechanical agitation, for 9 hours.

A yield of 40.2 parts of crude terephthalic acid is obtained. This is a yield of 35.7% terephthalic acid based on the para-diisopropylbenzene in the starting material.

In a comparative run carried out under similar conditions except using cobalt cumate as the catalyst, the crude terephthalic acid yield is 9.8 parts (i. e., only 7.8%); and the acid product is dark in color and of relatively poor quality. These results show clearly that an at least about 4-fold higher yield of better quality product is obtained by using the manganese cumate catalyst as compared to the cobalt cumate.

Example 3

Example 1 is repeated except that the use of acetic acid is omitted. There is obtained a yield of about 3% terephthalic acid.

Example 4

Into the reactor vessel of Example 1, there are charged:

50 parts by weight of diisopropylbenzene (84% para-)
100 parts of benzoic acid
1.5 parts of manganese cumate The reaction vessel is about half filled with the liquid mixture.

Substantially 100% oxygen is fed into the reaction mixture at the rate of about 1000 volumes (measured at atmospheric pressure and about 27° C.) per volume of hydrocarbon per hour, while the reaction mixture is maintained at 180° C., with vigorous agitation, for 7 hours.

The crude solid terephthalic acid in the mixture is separated by filtration, given three washings with about 100% acetic acid, each washing being with about 300 parts by weight of acetic acid per 40 parts of the precipitate, and then given three washings with water, using approximately similar amounts. The acetic acid washings are distilled; the residue may be recycled to the reactor or may be processed to recover isophthalic acid.

The exit gases from the reactor are passed through two Dry Ice traps in series, and the liquid collected therein during the reaction is washed with about 2 volumes of water to remove water soluble materials therefrom, and then added to the above filtrate. The filtrate is then combined with the residue from the acetic acid washings, and the mixture distilled.

The distillation is continued until the temperature reaches 139° C. at 1–2 mm. Hg pressure. The distillation is then continued up to a temperature of 250° C. at 1–2 mm. Hg pressure. The residue remaining in the distillation vessel is resinous and carbonaceous. The distillate cuts may be recycled to the reactor, e. g., in the next run.

A yield of 13.5 parts of crude terephthalic acid is obtained, of 92.6% purity (i. e., 32.2% of theory).

Example 5

Example 1 is repeated substituting for the para-diisopropylbenzene there utilized 125 parts by weight of diisopropylbenzene (90% meta- and 10% para-). There is obtained a 33.8% yield of isophthalic acid based on the meta-diisopropylbenzene starting material.

Example 6

Example 1 is repeated substituting for the manganese cumate there used an equivalent amount (based on manganese) of manganese oxide. Substantially similar results are obtained.

Example 7

Example 5 is repeated substituting for the manganese cumate there utilized an equivalent amount (based on manganese) of manganese hydroxide. Substantially similar results are obtained.

Example 8

In a series of runs Example 1 is repeated substituting for the acetic acid there utilized equal weights respectively of propionic, butyric, valeric, caproic, enanthic and caprylic acids and the pressure is varied to maintain the temperature of the system at a temperature of approximately 180° C. and to maintain a liquid phase of the carboxylic acid. There are obtained yields of terephthalic acid in the range of 30–40% based on the para-diisopropylbenzene in the starting material. Similar results are obtained utilizing ortho- or meta-diisopropylbenzene as a starting material.

Example 9

In a series of two runs the procedure of Example 1 is repeated substituting for the manganese cumate there used equivalent amounts (based on manganese) of manganese borate and manganese nitrate respectively. Substantially similar results are obtained.

It will be realized that in the foregoing examples there may be substituted for the particular acids utilized therein as solvents monocarboxylic acids of 1 to 8 carbon atoms in the molecule. Preferably, these acids do not contain hydrogen atoms attached to a tertiary carbon atom.

The phthalic acids produced according to this invention may be utilized in the preparation of alkyd resins as aforementioned. In the case of terephthalic acid, the crude terephthalic acid may be converted to dimethyl terephthalate by reaction with methanol in the presence of a catalytic amount of an acid such as hydrochloric, sulfuric, phosphoric or the like; e. g., 1 to 3% by weight of the reaction mixture. If desired, the crude acid may be washed with methanol, ethanol or propanol before esterification. The pure ester may be recovered by fractionation, e. g., distillation or crystallization.

Alternatively, the crude terephthalic acid may be converted to the corresponding acid chloride by reaction with thionyl chloride; and the latter converted to dimethyl terephthalate by reaction with methanol. For instance, 25 grams of crude terephthalic acid may be refluxed with 350 cc. of thionyl chloride for 8 hours, while a stream of nitrogen gas is slowly bubbled through the reaction mixture to carry away the hydrochloric acid and sulfur dioxide by-product gases. The excess thionyl chloride is removed by evaporation, over a steam bath. The last traces of thionyl chloride are removed at low pressure. The resulting crude acid chloride is converted to the corresponding dimethyl terephthalate by refluxing with 600 cc. of absolute methanol for 16 hours. About two-thirds of the excess methanol is removed by evaporation, over a steam bath. The residue or sludge is then washed with acetone, and the residual methanol and acetone therein is evaporated, over a steam bath. The crude dimethyl terephthalate is condensed, filtered, and dried over calcium chloride at low pressure. The resulting dimethyl terephthalate product is of very high purity (melting point 141–141.5° C.). In a comparative esterification procedure using pure terephthalic acid, 95% of the theoretical yield of dimethyl terephthalate is obtained.

While it is preferred to utilize the manganese compound in the form of a carboxylate, optionally as a salt of a particular carboxylic acid being utilized as a solvent, it will be realized that various other manganese salts are useful herein. These salts are illustrated, for example, by the oxide, hydroxide, nitrate, borate, and the like.

The metal carboxylate catalysts may be prepared by reacting the metal oxide or other compound with the appropriate acid in known manner. For higher acids they may be prepared by dissolving the appropriate organic acid in caustic, and then adding thereto an aqueous solution of the appropriate metal acetate. The desired metal carboxylate salt forms a precipitate, in the case of the carboxylic acids higher than acetic. The precipitate is separated by filtration, thoroughly washed with water, air dried, and then dried over calcium chloride under low pressure. For instance, manganese cumate may be prepared by dissolving 20 grams of cumic acid in 100 cc. of 5% by weight aqueous sodium hydroxide. A solution of 15 grams of manganese acetate dissolved in 75 cc. of water is gradually added thereto, with agitation. The manganese cumate precipitate which forms is separated by filtration, thoroughly washed with water, air dried, and then dried over calcium chloride under low pressure. An about 90% yield of the catalyst is obtained. The manganese cumate prepared in this manner is soluble in para-diisopropylbenzene; e. g., to a concentration of 0.1% by weight. However, if the manganese cumate is over dried at about 80° C. or higher for several hours, it tends to darken, and the darkened salt is much less soluble in para-diisopropylbenzene.

The crude solids obtained from the oxidation reaction mixture are washed with glacial (about 100%) acetic acid. This washing step removes substantially all of the isophthalic acid therein, if any. Separation by means of acetic acid provides a very convenient method of obtaining a fraction of relatively pure isophthalic acid as well as a fraction of relatively pure terephthalic acid from the oxidation of a mixture of diisopropylbenzene containing substantial amounts of both the meta- and the para-isomers.

The process may be conducted in a batch, intermittent or a continuous manner.

Desirable results are achieved with various modifications of the foregoing, such as the following. The pressure should be sufficient to maintain the lower acid liquid. Generally, the pressure is in the range of 100 to 1500 p. s. i. g. (pounds per square inch gauge), or in the range of 15 to 2000 p. s. i. g. (pounds per square inch gauge), preferably at least slightly above the boiling pressure of the acid at the reaction temperature.

In the air oxidation step, there is used a suitable reaction vessel having a corrosion resistant inner surface (glass, ceramic or corrosion resistant metal or alloy), equipped with agitating means, indirect cooling means, and an air inlet. About 10 wt. % of manganese terephthalate or acetate or linoleate is added thereto, the temperature brought up to about 125 to 180° C., and air passed thereinto at the rate of 40–80 parts (weight basis) per hour for about 25–35 hours. This gives an about 20–40% partial oxidation or conversion of the hydrocarbon to dicarboxylic acid. The resulting acid is a solid and is separated by filtration, or by means of a wringer, or other suitable means. The filtrate is returned to the oxidation reaction vessel for use in the next cycle. The crude acid is washed with about 2 volumes of water, then optionally about 2 volumes of dilute hydrochloric acid (1–5%) to remove any residual catalyst therein, then again with about 2 volumes of water, and then dried. The terephthalic product is eminently suitable with minimum further purification for use in preparing synthetic textile fabrics or polyester resins. Over a large number of cycles, a very high conversion of para-diisopropylbenzene to terephthalic acid is achieved in an economic manner in accordance with the invention.

The carboxylic acid may be a mono-carboxylic acid of 1 to 4 carbon atoms, preferably at least 2, stable in the reaction system. Preferably the acid is free of hydrogen atoms attached to tertiary carbon atoms. Mixtures of acids may be used. Also, the acid may be one having 5 to 6 carbon atoms which is not completely miscible with water, or up to and including 8 carbon atoms in the molecule.

The oxidation is conducted in the presence of a solvent for the hydrocarbon, which solvent is relatively inert to the oxidation in the system, such as a lower aliphatic acid or a lower araliphatic acid, such as acetic, propionic, butyric, valeric acid, isobutyric, phenyl acetic, beta-ethoxy acetic acid, and the like. The solution may contain from about 10 to 90% of the solvent, preferably 12 to 40%.

The reaction temperature may be in the range of 150 to 275° C., and desirably 175 to 250° C., and preferably 175 to 225° C. The reaction temperature and pressure are interrelated, and a particular combination thereof is selected so as to maintain the desired amount of liquid lower acid in the reaction system. The reaction temperature may be regulated by adjusting the pressure so as to allow heat of reaction to be removed by volatilization of lower acid. Acid vapor may be removed from the system, passed through the reflux condenser to condense this vapor, an amount thereof returned to the reactor to maintain the desired acid concentration. The water formed during the reaction may be discarded from the system.

The reaction time may be in the range of 0.5 to 50 or more hours, the actual reaction time being sufficient to obtain a desirable yield of terephthalic acid from the para-diisopropylbenzene. Generally, higher reaction temperatures and corresponding pressures are reflected in shorter reaction times to give comparable yields of the desired products.

The manganese carboxylate catalyst may be the manganese salt of any carboxylic acid, which salt is finely dispersed in the reaction system, desirably a monocarboxylic acid of 2 to 10 carbon atoms, and preferably the salt of an acid formed in the reaction system. Unique results may be obtained with such catalysts. However, if all the advantages thereof are not required, other heavy metal compounds may be used instead. Mixtures thereof may be used.

In the oxidation of the diisopropylbenzenes to phthalic acids, the preferred catalytic materials which may be used are compounds of manganese. Mixtures may be employed. The compounds may be in the form of oxides, hydroxides, or salts, or combinations thereof. The organic salts may be of one or more of the acids formed in the reaction system, or of carboxylic acids, such as acetic acid and the other lower fatty acids, naphthenic acids, and the like. These may be prepared in known manner.

The ratio of the lower acid may be in the range of 1 to 8 mols, desirably in the range of 1 to 4, preferably in the range of 2.5 to 3.5 mols per mol of the diisopropylbenzene. If lower amounts of the lower acid are used, there is some difficulty due to excessive resin formation. Higher amounts are operative but are not indicated for economic reasons.

In the production of terephthalic acid, the para-diisopropylbenzene fed into the reactor may be in the form of any technically pure mixture free from contaminants or materials which may interfere with the oxidation. Generally the mixture may contain some meta-diisopropylbenzene and also some lower or higher alkylated benzenes. It may also contain some saturated aliphatic hydrocarbon material which is relatively resistant to oxidation in the system. For best results, substantially pure para-diisopropylbenzene should be used, e. g., 99 to 100%.

The amount of catalyst used may be in the range of 0.1 to 5.0% by weight based upon the weight of diisopropylbenzene fed into the reaction mixture, desirably 1 to 3; i. e., containing 0.2 to 2% of the metal. The amount of catalyst used may be in the range of 0.1 to 10% by weight based upon the weight of the reaction mixture, desirably 0.3 to 2, and preferably .75 to 1.7%, i. e., containing 0.2 to 4% of the metal.

The oxygen used may be in the form of substantially 100% oxygen gas or in the form of gaseous mixtures containing lower concentrations of oxygen, e. g., down to about 20%, such as in air. Where the gaseous mixture contains a relatively lower concentration of oxygen, a correspondingly higher pressure or flow rate of the gas should be used, in order that a sufficient amount (or partial pressure) of oxygen is actually fed into the reaction mixture.

The ratio of oxygen fed into the reaction mixture relative to the diisopropylbenzene is in the range of 9 to 100 or more mols of oxygen per mol of diisopropylbenzene, desirably in the range of 10 to 50, and preferably in the range of 10 to 15, or in the range of 5 to 500 mols of oxygen per mol of diisopropylbenzene, desirably in the range of 10 to 300, and preferably in the range of 10 to 75.

The reaction temperature, reactant concentration, catalyst and its concentration, reaction time and yield of product are interrelated. Generally, higher temperatures are reflected in shorter reaction times, as are more active catalysts. Too high temperatures or too severe conditions tend to give somewhat poorer product. The particular combination of reaction mixture composition and reaction conditions used should be selected with a view to obtaining the best output of desired quality product.

Other materials may be present during the oxidation reaction, providing they do not interfere with the desired reaction.

As previously indicated, the lower acids which may be used to advantage in accordance with the invention may contain 1 to 8 carbon atoms, preferably at least 2, in the molecule. In certain situations, acetic acid is preferred. Of course, elevated pressures would be required to maintain a liquid phase of this acid throughout the indicated temperatures which liquid phase, as shown hereinbefore, is essential for the invention.

It is indeed surprising that phthalic acid may be prepared from diisopropylbenzene in such a convenient manner in accordance with the invention, especially when one considers the difficulty of obtaining these acids by heretofore proposed methods, even though there is a high commerical demand for such acids. In analogous tests, using a mixture of caproic acid and para-diisopropylbenzene wih no manganese cumate, only a dark resinous mixture or gunk was obtained. In addition, the yields in analogous tests to Example 2 with other materials such as lead cumate, silver cumate, cobalt octoate (18.6%), zinc acetate, mercuric oxide, or vanadium oxide, were no better than the above mentioned cobalt cumate results.

In view of the foregoing discussions, variations and modifications of the invention will be apparent to one skilled in the art, and it is intended to include within the invention all such variations and modifications except as do not come within the scope of the appended claims.

This application is a continuation-in-part of presently co-pending applications Serial Nos. 343,523 and 343,524, each filed March 19, 1953; 349,081, filed April 15, 1953; 351,477, filed April 27, 1953; 482,677, filed January 18, 1955; and 305,972, filed August 23, 1952, all abandoned.

I claim:

1. A process for preparing phthalic acids which comprises reacting diisopropylbenzene with molecular oxygen in the presence of a manganese compound as a catalyst and in the presence as a solvent a mono-carboxylic acid of 2 to 8 carbon atoms in the molecule inert to the oxidation system, at a temperature in the range of 150° to 275° C. and at a pressure such that a liquid phase of said solvent acid is maintained.

2. A process of claim 1 wherein the catalyst is a manganese carboxylate.

3. A process of claim 2 wherein the reaction mixture contains 0.1 to 5% of the catalyst based on the weight of the diisopropylbenzene.

4. A process of claim 1 wherein the solvent acid is benzoic.

5. A process of claim 1 wherein the solvent acid is acetic.

6. A process of claim 1 wherein the solvent acid is caproic.

7. A process for producing terephthalic acid in a liquid phase oxidation which comprises reacting p-diisopropylbenzene with molecular oxygen in the presence of a catalytic amount of a manganese compound and in the presence of as a solvent a lower saturated aliphatic monocarboxylic acid having 2 to 4 carbon atoms as a solvent, at a temperature in the range of 150 to 275° C. and at a pressure such that a liquid phase of said solvent acid is maintained.

8. A process for producing terephthalic acid in a liquid phase oxidation which comprises reacting p-diisopropylbenzene with molecular oxygen in the presence of a catalytic amount of a manganese carboxylate and in the presence of acetic acid as a solvent, at a temperature in the range of 150 to 275° C. and pressure such that a liquid phase of acetic acid is maintained.

9. A process for producing terephthalic acid in a liquid phase oxidation which comprises reacting p-diisopropylbenzene with a catalytic amount of a manganese carboxylate and in the presence as a solvent from 1 to 10 parts by weight of acetic acid per part of p-diisopropylbenzene at a temperature in the range of 180 to 210° C., at a pressure in the range of about 300 to 400 p. s. i. g.

10. A process of claim 1 conducted in a continuous manner wherein further amounts of diisopropylbenzene are added to the reaction mixture, a portion of the reaction medium is withdrawn and the phthalic acid product is recovered from the withdrawn reaction medium as product.

11. A process of claim 1 wherein the diisopropylbenzene is meta-diisopropylbenzene.

12. A process of claim 1 wherein the diisopropylbenzene is para-diisopropylbenzene.

13. The process of claim 1 comprising the additional steps of removing heat of reaction by removing from the reaction system vapors containing water vapor and vapors of monocarboxylic acid solvent, condensing from said vapors said acid solvent, recycling to the reaction system said condensate, and withdrawing water vapors, thereby maintaining the desired concentration of said solvent acid.

References Cited in the file of this patent

UNITED STATES PATENTS

| | | |
|---|---|---|
| 2,245,528 | Loder | June 10, 1941 |
| 2,552,278 | Hochwalt | May 8, 1951 |
| 2,723,994 | Haefele et al. | Nov. 15, 1955 |
| 2,746,990 | Fortuin et al. | May 22, 1956 |

FOREIGN PATENTS

| | | |
|---|---|---|
| 681,455 | Great Britain | Oct. 22, 1952 |